United States Patent
Kim et al.

(10) Patent No.: US 10,476,398 B1
(45) Date of Patent: Nov. 12, 2019

(54) POWER CONVERSION CIRCUIT FOR PHOTOVOLTAIC POWER GENERATION WITH HIGH EFFICIENCY OVER WIDE INPUT VOLTAGE RANGE

(71) Applicant: POSTECH ACADEMY-INDUSTRY FOUNDATION, Pohang-si (KR)

(72) Inventors: Minsung Kim, Pohang-si (KR); Sooa Kim, Pohang-si (KR); Bumyun Kim, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 15/968,644

(22) Filed: May 1, 2018

(51) Int. Cl.
| | |
|---|---|
| *H02M 3/335* | (2006.01) |
| *H02M 7/219* | (2006.01) |
| *H02M 7/48* | (2007.01) |
| *H02M 1/00* | (2006.01) |
| *H02J 3/38* | (2006.01) |

(52) U.S. Cl.
CPC ......... *H02M 3/33576* (2013.01); *H02J 3/385* (2013.01); *H02M 7/219* (2013.01)

(58) Field of Classification Search
CPC ......... H02M 3/33569; H02M 3/33576; H02M 3/33592; H02M 3/335; H02M 3/33523; H02M 3/33538; H02M 3/33553; H02M 7/219; H02M 2007/4815; H02M 2007/4818; H02M 7/4826; H02M 2001/0058
See application file for complete search history.

(56) References Cited

U.S. PATENT DOCUMENTS

| | | | | |
|---|---|---|---|---|
| 8,724,348 B2* | 5/2014 | Sase | .................. | H02M 3/33592 363/131 |
| 9,025,345 B2* | 5/2015 | Shimada | ............. | H02M 1/4258 363/17 |
| 9,379,621 B1* | 6/2016 | Kalyanaranman | .......................... | H02M 3/33507 |
| 9,515,562 B2* | 12/2016 | Dai | ..................... | H02M 3/3353 |
| 9,627,979 B2* | 4/2017 | Safaee | ............... | H02M 3/33507 |
| 9,831,790 B2* | 11/2017 | Mizushima | ......... | H02M 3/3376 |
| 10,020,748 B2* | 7/2018 | Takagi | .............. | H02M 3/33546 |

(Continued)

*Primary Examiner* — Yusef A Ahmed
*Assistant Examiner* — Sisay G Tiku
(74) *Attorney, Agent, or Firm* — Morgan, Lewis & Bockius LLP

(57) ABSTRACT

The present invention relates to a technique for expanding an input voltage range of a power conversion circuit for photovoltaic power generation, and improving the efficiency of the power conversion circuit.

The power conversion circuit for photovoltaic power generation with high efficiency over a wide input voltage range may include: a full-bridge converter unit including a full-bridge converter constituted by first to fourth switches, and configured to operate in a resonant boost mode or phase-shift full-bridge series-resonant converter mode, and convert an input DC voltage into a DC voltage having a level equal to or lower than the input DC voltage; an active voltage-doubler rectifier circuit including a half-bridge converter constituted by fifth and sixth switches, a resonance inductor and a resonance capacitor, and configured to boost an input voltage to a target-level DC voltage, and output the DC voltage to a load; and a transformer configured to connect the full-bridge converter and the active voltage-doubler rectifier to each other in their insulation.

17 Claims, 10 Drawing Sheets

(56) References Cited

U.S. PATENT DOCUMENTS

| | | | |
|---|---|---|---|
| 2005/0029872 A1* | 2/2005 | Ehrman | H02J 1/08 307/11 |
| 2010/0232180 A1* | 9/2010 | Sase | H02M 3/33576 363/17 |
| 2013/0100707 A1* | 4/2013 | Hatakeyama | H02M 3/3376 363/17 |
| 2013/0272032 A1* | 10/2013 | Mueller | H02M 3/3387 363/17 |
| 2014/0268892 A1* | 9/2014 | Zhou | H02M 3/33592 363/17 |
| 2014/0268903 A1* | 9/2014 | Reiter | H02M 3/3376 363/21.02 |
| 2015/0229225 A1* | 8/2015 | Jang | H02M 3/285 363/17 |
| 2016/0094135 A1* | 3/2016 | Dai | H02M 3/33576 363/21.02 |
| 2016/0094136 A1* | 3/2016 | Fu | H02M 3/1582 363/21.02 |
| 2016/0149501 A1* | 5/2016 | Dai | H02M 3/337 363/21.02 |
| 2016/0294294 A1* | 10/2016 | Ye | H02M 3/33592 |
| 2016/0322968 A1* | 11/2016 | Mao | H02M 3/33561 |
| 2017/0317601 A1* | 11/2017 | Jin | H02M 3/28 |
| 2018/0183347 A1* | 6/2018 | Ye | H02M 3/33592 |

* cited by examiner

POWER CONVERSION CIRCUIT FOR PHOTOVOLTAIC POWER GENERATION WITH HIGH EFFICIENCY OVER WIDE INPUT VOLTAGE RANGE

BACKGROUND

1. Technical Field

The present disclosure relates to a technique for improving the input voltage range and efficiency of a power conversion circuit for photovoltaic power generation, and more particularly, a power conversion circuit for photovoltaic power generation with high efficiency over a wide input voltage range, which can expand an input voltage range using a full-bridge circuit based on an active voltage-doubler rectifier, and exhibit higher efficiency through soft switching.

2. Related Art

As is well known, a photovoltaic power generation system is an eco-friendly power generation system using a permanent energy source. Thus, the photovoltaic power generation system has rapidly come into wide use, and much research is actively conducted on the photovoltaic power generation system more than any other systems.

The photovoltaic power generation system includes a photovoltaic cell module having an operating voltage and current point at which the photovoltaic cell module is controlled to have the maximum output power depending on solar radiation. Such a control method is referred to as a maximum power point tracking (MPPT).

In a conventional central photovoltaic inverter-type power generation system, photovoltaic cell modules are connected in series to output a sine-wave voltage through one central photovoltaic inverter.

However, the central photovoltaic inverter-type power generation system may have a difficulty in tracking the maximum power points through one inverter, when the maximum power points of some photovoltaic cell modules are changed by shadow.

Therefore, as a part for solving such a difficulty, a micro inverter may be mounted in each of the photovoltaic cell modules to acquire the maximum power.

However, since the photovoltaic cell modules have different maximum power points depending on the types thereof and the environment therearound, the inverters installed in the photovoltaic cell modules must cover a wide input voltage range in consideration of the different maximum power points. Such an inverter is mainly constituted by a converter terminal and an inverter terminal which receives a high DC voltage output of the converter terminal as an input voltage and converts the received voltage into an AC voltage for system interconnection. The converter terminal must have a high boosting ratio to boost a low input voltage of 30 to 65V into a high voltage of 380V for an inverter terminal.

When the converter is implemented with a full-bridge series resonant converter, a primary-side switch can be soft-switched, and a small amount of circulating current may be used. Furthermore, a rectification diode has low voltage stress, and a simple circuit configuration may be applied. For these reasons, the full-bridge series resonant converter is employed as the converter for the photovoltaic cell module in more and more cases.

In the conventional photovoltaic power generation system, the full-bridge series-resonant converter employed as the converter for the photovoltaic cell module is a buck-type converter. However, the buck-type converter cannot provide a high boosting ratio across a wide input voltage range.

SUMMARY

Various embodiments are directed to a technique for expanding an input voltage range of a power conversion circuit for photovoltaic power generation and improving the efficiency of the power conversion circuit, when a converter for a photovoltaic cell module is implemented with a full-bridge series-resonant converter.

In an embodiment, a power conversion circuit for photovoltaic power generation with high efficiency over a wide input voltage range may include: a full-bridge converter unit including a full-bridge converter constituted by first to fourth switches, and configured to operate in a resonant boost mode or phase-shift full-bridge series-resonant converter mode, and convert an input DC voltage into a DC voltage having a level equal to or lower than the input DC voltage; an active voltage-doubler rectifier circuit including a half-bridge converter constituted by fifth and sixth switches, a resonance inductor and a resonance capacitor, and configured to boost an input voltage to a target-level DC voltage, and output the DC voltage to a load; and a transformer configured to connect the full-bridge converter and the active voltage-doubler rectifier to each other in their insulation.

DETAILED DESCRIPTION

Hereafter, exemplary embodiments of the present invention will be described below in more detail with reference to the accompanying drawings.

Figure 1:
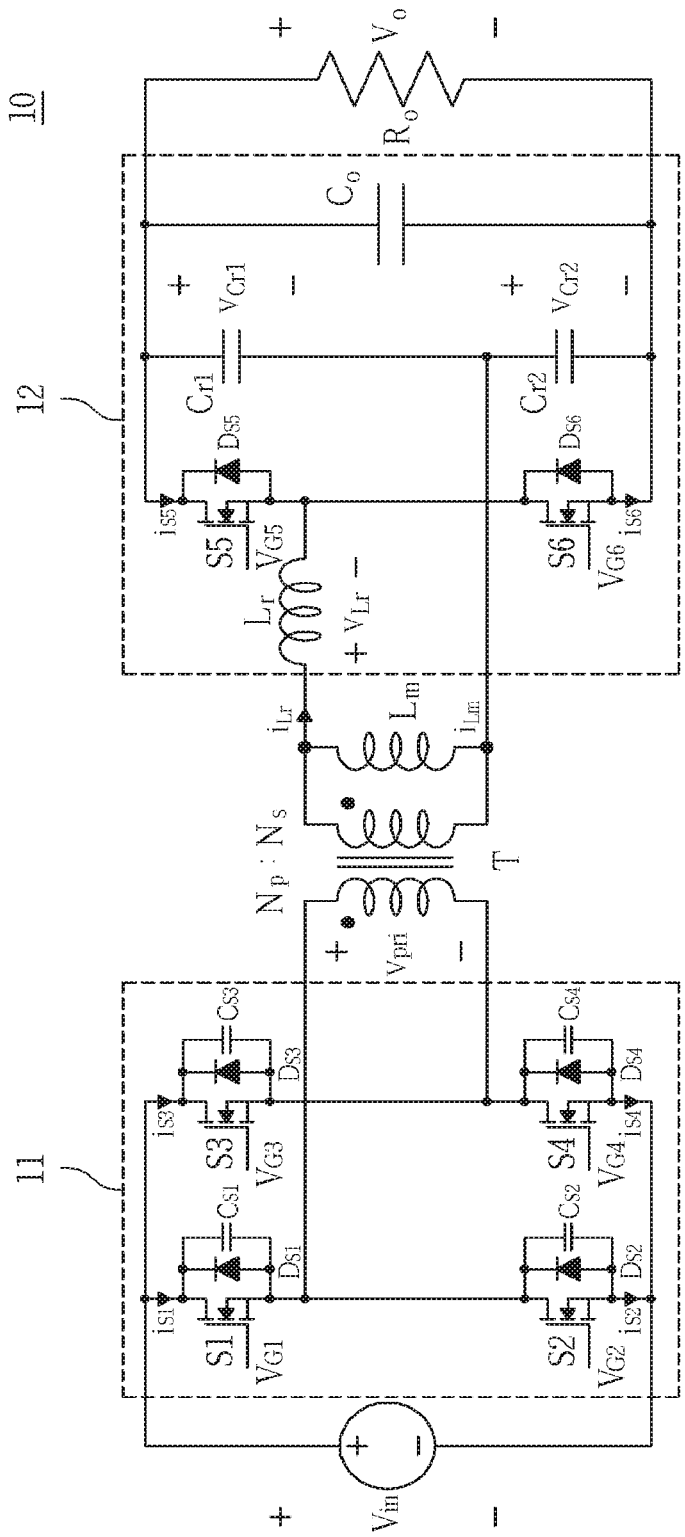
FIG. 1 is a circuit diagram illustrating a power conversion circuit for photovoltaic power generation with high efficiency over a wide input voltage range according to an embodiment of the present invention.

FIG. 1 is a circuit diagram illustrating a power conversion circuit for photovoltaic power generation with high efficiency over a wide input voltage range according to an embodiment of the present invention. As illustrated in FIG. 1, the power conversion circuit 10 for a thermoelectric energy generator includes a full-bridge converter unit 11, an active voltage-doubler rectifier circuit 12 and a transformer T.

The full-bridge converter unit 11 includes four switches S1 to S4 which constitute a full-bridge converter to switch an input DC voltage Vin. The switches S1 and S2 are complementarily turned on, and the switches S3 and S4 are complementarily turned on.

The active voltage-doubler rectifier circuit 12 includes two switches S5 and S6, a resonance inductor Lr and resonance capacitors Cr1 and Cr2. The switches S5 and S6 are connected in parallel to a load Ro so as to constitute a half-bridge converter.

The transformer T connects the full-bridge converter unit 11 and the active voltage-doubler rectifier circuit 12 to each other in their insulation, and has a turn ratio of Np:Ns.

The types of the switches S1 to S6 are not limited to a specific type. In the present embodiment, the switches S1 to S6 are implemented with MOS transistors, for example. The switches S1 to S6 are connected in parallel to body diodes, respectively. The switches S1 to S6 are turned on by gate voltages VG1 to VG6 supplied from a controller (not illustrated).

The full-bridge converter unit 11 receives the input DC voltage Vin, and converts the received voltage into a DC voltage having the same level as or a lower level than the input DC voltage Vin.

The active voltage-doubler rectifier circuit 12 boosts a voltage inputted from the transformer T to a target-level DC voltage, and outputs the DC voltage to the load Ro.

The transformer T serves to connect the full-bridge converter unit 11 and the active voltage-doubler rectifier circuit 12 to each other in their insulation.

The gate signals of the switches S1 to S4 are square waves of which the duty cycle is fixed at 0.5 and which have only different phases with a slight dead time. A phase shift of the voltage outputted from the full-bridge converter unit 11 is controlled by the switches S1 and S2 and the switches S3 and S4 which are complementarily switched. When an input voltage lower than a reference voltage is received so that the switches S5 and S6 of the active voltage-doubler rectifier circuit 12 are operated to have a high boosting ratio, the full-bridge converter unit 11 is operated in a resonant boost mode. On the other hand, when an input voltage higher than the reference voltage is received so that the phase shift has a smaller value than the maximum value, the full-bridge converter unit 11 is operated in a phase-shift full-bridge series-resonant converter mode. The reference voltage may indicate an input voltage when the phase shift has the maximum value, or a turn-on phase difference between the switches S1 and S4 has the maximum value. When the full-bridge converter unit 11 is operated in the phase-shift full-bridge series-resonant converter mode, the switches S5 and S6 of the active voltage-doubler rectifier circuit 12 are maintained in an off state.

When the input DC voltage Vin is higher than the reference voltage, the full-bridge converter unit 11 is operated in the phase-shift full-bridge series-resonant converter mode. At this time, the switches S5 and S6 of the active voltage-doubler rectifier circuit 12 operate as a general doubler rectifier circuit, while maintaining an off state at all times.

When the input DC voltage Vin is lower than the reference voltage, the full-bridge converter unit 11 operates in the resonant boost mode. In the resonant boost mode, the switches S5 and S6 of the active voltage-doubler rectifier circuit 12 are operated to raise a boosting ratio of input/output voltage in the active voltage-doubler rectifier circuit 12. In the resonant boost mode, the gate signals of the switches S5 and S6 are square waves of which the switching period is set to 1/fs (Ts=1/fs) and which always have a maximum phase difference therebetween while having the same duty cycle.

The switches S1 to S4 of the full-bridge converter unit 11 are turned on or off to perform zero voltage switching. When body diodes $D_{S5}$ and $D_{S6}$ of the switches S5 and S6 of the active voltage-doubler rectifier circuit 12 are operated in the resonant boost mode, almost no turn-off reverse current is generated. Thus, a reverse recovery problem does not occur, which makes it possible to acquire high efficiency as a whole.

The resonant boost mode may be divided into first to eighth resonant boost modes M1 to M8, and FIGS. 2A to 2H are circuit diagrams illustrating the drive states of the elements in the first to eighth resonant boost modes. FIG. 3 is a waveform diagram illustrating gate-source currents $i_{S1}$ to $i_{S6}$ and the gate voltages $V_{B1}$ to $V_{G6}$ supplied to the gates of the switches S1 to S6, currents of the resonance inductor Lr and a magnetizing inductor Lm, a voltage $V_{cr}$ of a resonance capacitor, and a primary-side voltage $V_{pri}$ of the transformer.

The first to eighth resonant boost modes M1 to M8 will be described with reference to FIGS. 2 and 3.

Figure 2A:
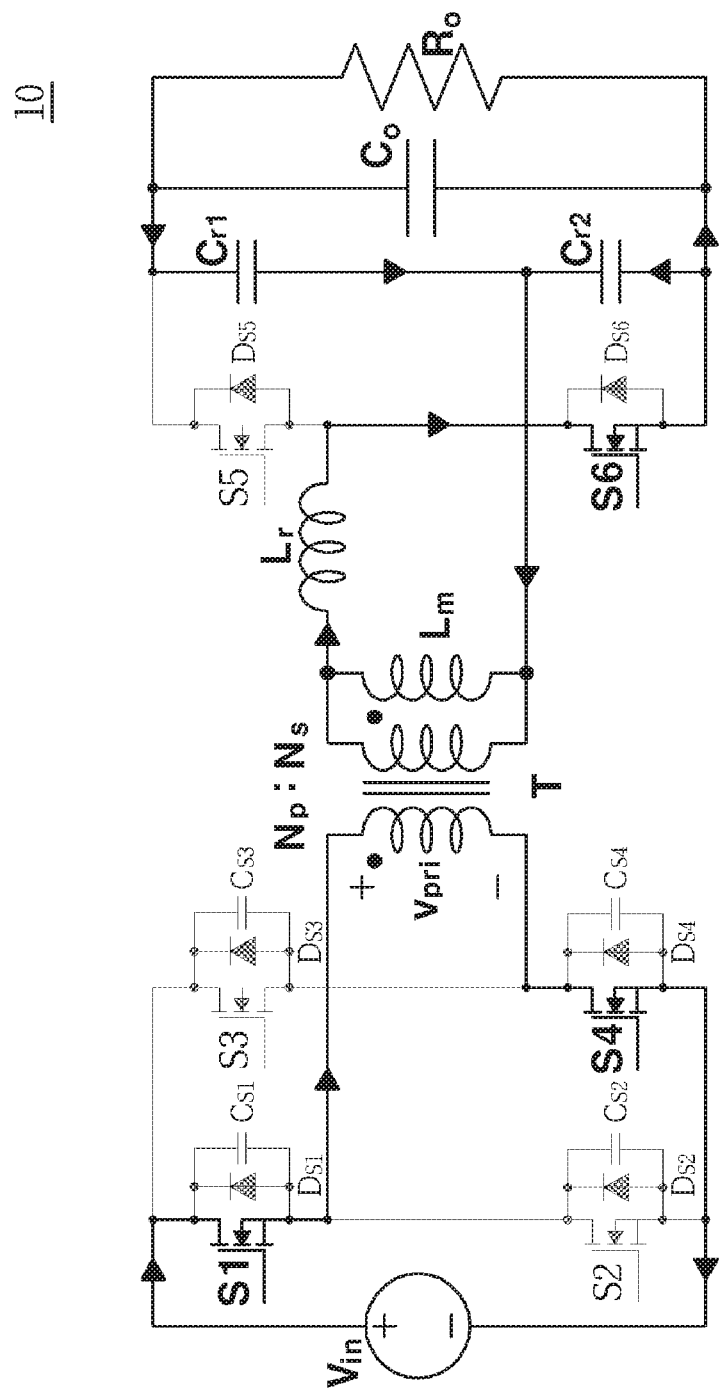
FIGS. 2A to 2H are circuit diagrams illustrating drive states of elements in first to eighth resonant boost modes.
Figure 3:
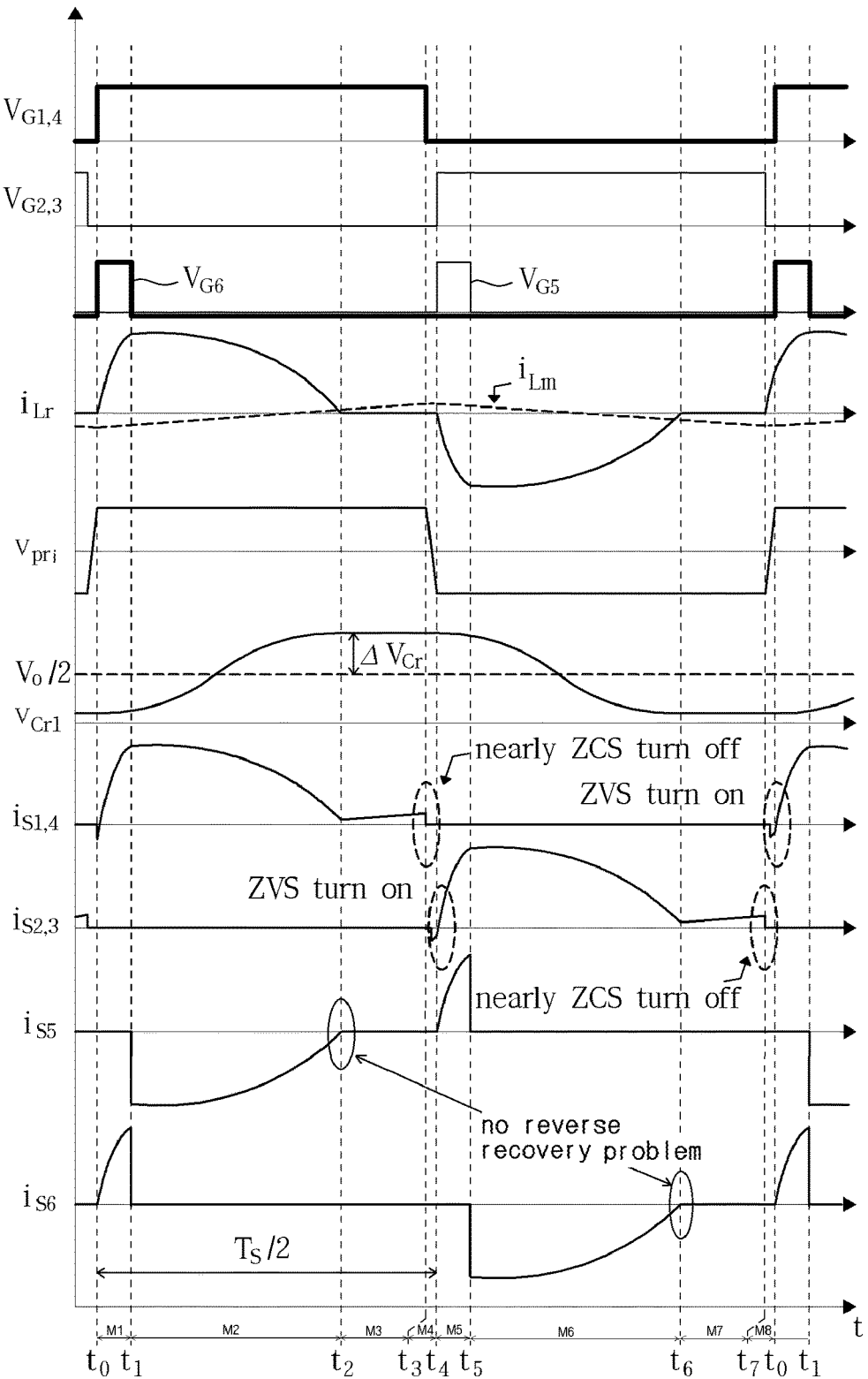
FIG. 3 is a waveform diagram illustrating gate voltages and gate-source currents of switches, currents of a resonance inductor and magnetizing inductor, a voltage of a resonance capacitor, and a primary-side voltage of a transformer.

In the first resonant boost mode M1 as illustrated in FIG. 2A, the switches S1 and S4 of the full-bridge converter unit 11 and the switch S6 of the active voltage-doubler rectifier circuit 12 are turned on, and the switches S2 and S3 of the full-bridge converter unit 11 and the switch S5 of the active voltage-doubler rectifier circuit 12 are turned off. Therefore, as illustrated in FIG. 3, the magnetizing current $i_{Lm}$ of the magnetizing inductor Lm linearly increases, and electrical energy $i_{Lr}$ stored in the resonance inductor Lr rapidly increases. At this time, power of the primary coil of the transformer T is transferred to the secondary coil.

Figure 2B:
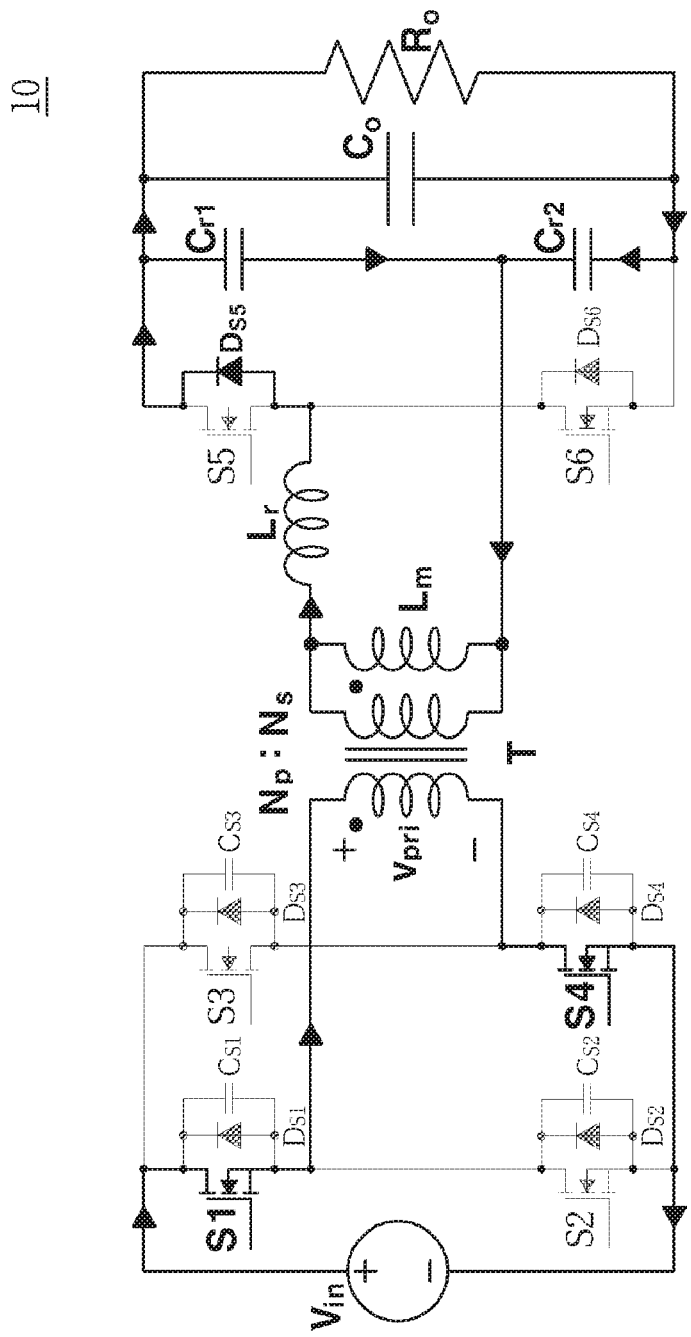

In the second resonant boost mode M2 as illustrated in FIG. 2B, the switches S1 and S4 of the full-bridge converter unit 11 and the body diode $D_{S5}$ of the switch S5 of the active voltage-doubler rectifier circuit 12 are maintained in an on state, and the switches S2 and S3 of the full-bridge converter unit 11 and the switch S6 of the active voltage-doubler rectifier circuit 12 are turned off. Therefore, the electrical energy $i_{Lr}$ stored in the resonance inductor Lr is transferred toward the load Ro through the body diode $D_{S5}$ of the switch S5. At this time, the magnetizing current $i_{Lm}$ of the magnetizing inductor Lm continuously increases in a linear manner.

Figure 2C:
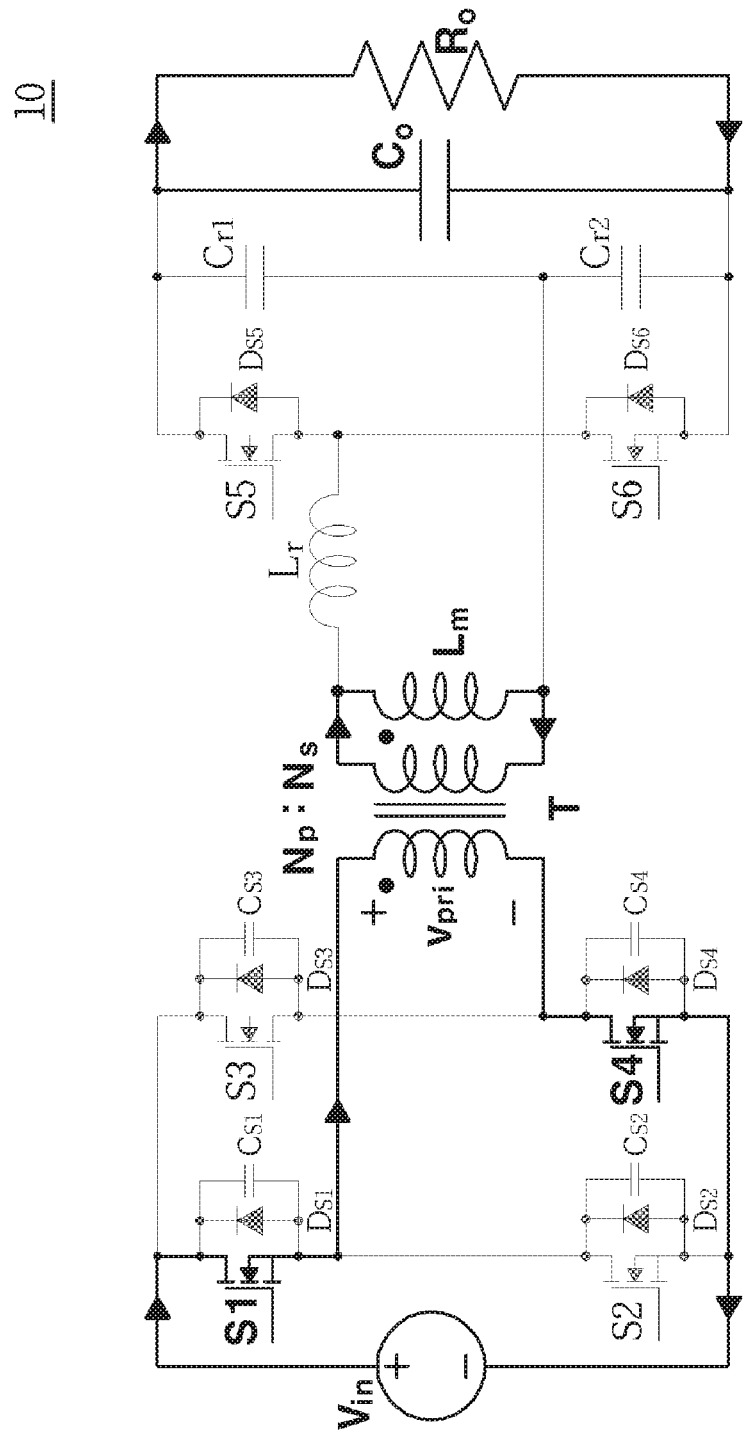

The third resonant boost mode M3 is started when the electrical energy $i_{Lr}$ stored in the resonance inductor Lr is zero. At this time, as illustrated in FIG. 2C, the switches S1 and S4 of the full-bridge converter unit 11 are turned on, and the switches S2 and S3 of the full-bridge converter unit 11 and the switches S5 and S6 of the active voltage-doubler rectifier circuit 12 are turned off. At this time, power is not transferred through the transformer T. As illustrated in FIG. 3, the magnetizing current $i_{Lm}$ of the magnetizing inductor Lm linearly increases.

Figure 2D:
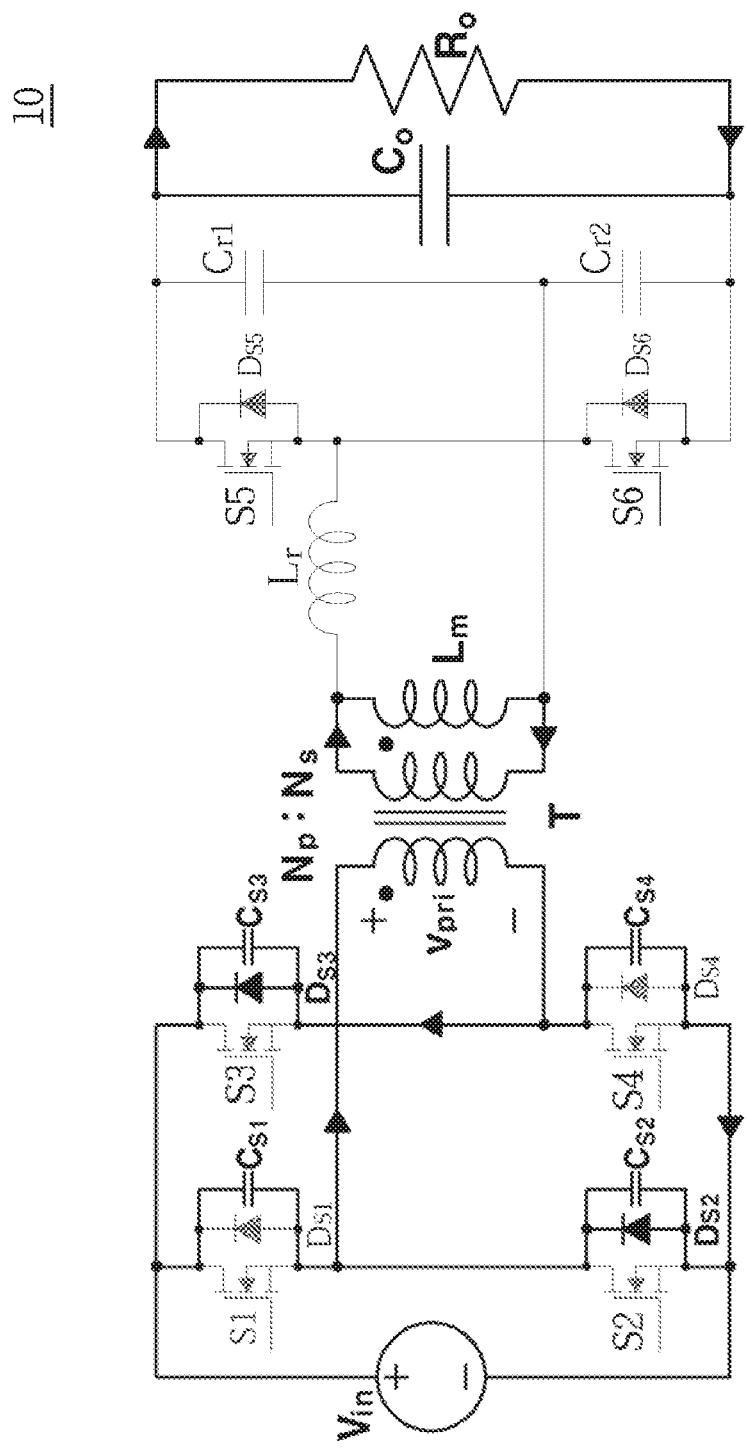

In the fourth resonant boost mode M4 as illustrated in FIG. 2D, the switches S1 to S4 of the full-bridge converter unit 11 and the switches S5 and S6 of the active voltage-doubler rectifier circuit 12 are all maintained in an off state. At this time, the magnetizing current $i_{Lm}$ of the magnetizing inductor Lm operates as a current source which charges parasitic capacitors $C_{S1}$ and $C_{S4}$ of the switches S1 and S4 while discharging parasitic capacitors $C_{S2}$ and $C_{S3}$ of the switches S2 and S3. Therefore, when the switches S2 and S3 are turned on, zero voltage switching can be performed.

Figure 2E:
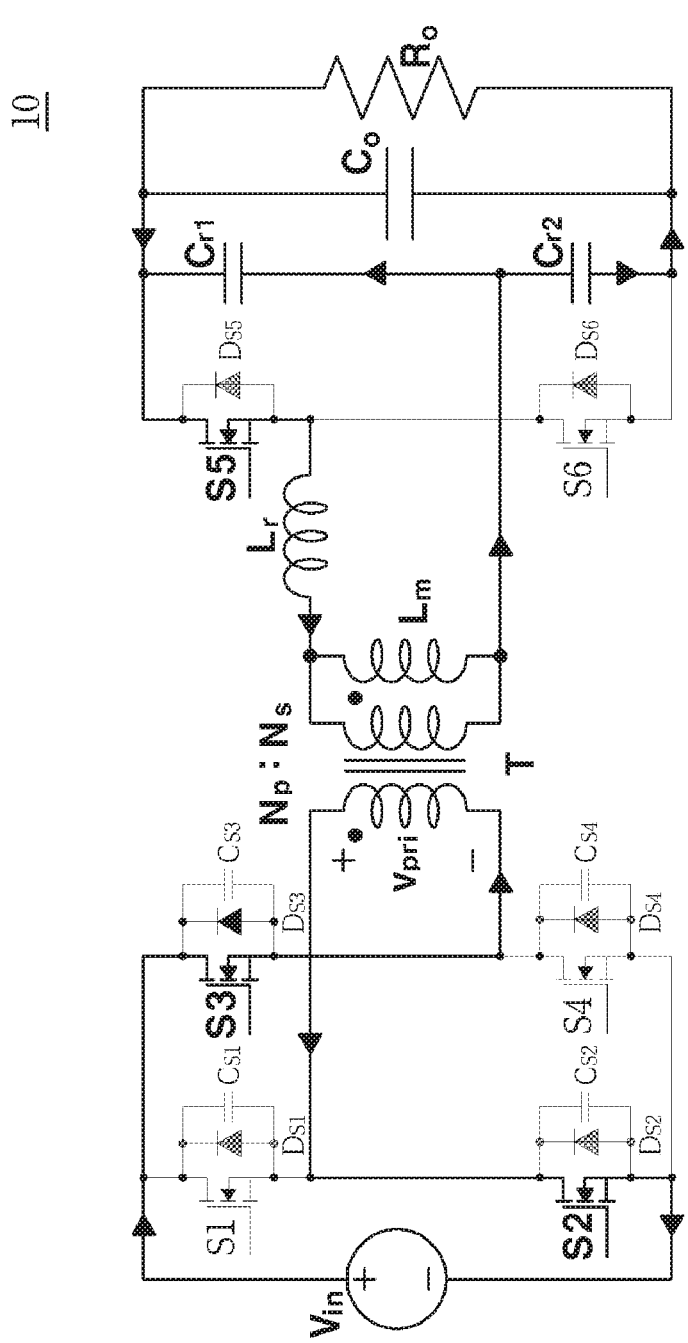

In the fifth resonant boost mode M5 as illustrated in FIG. 2E, the switches S2 and S3 of the full-bridge converter unit 11 and the switch S5 of the active doubler rectifier circuit 12 are turned on, and the switches S1 and S4 of the full-bridge converter unit 11 and the switch S6 of the active doubler rectifier circuit 12 are turned off. Therefore, as illustrated in FIG. 3, the magnetizing current $i_{Lm}$ of the magnetizing inductor Lm linearly increases in the negative direction, and electrical energy $i_{Lr}$ stored in the resonance inductor Lr rapidly increases. At this time, power of the primary coil of the transformer T is transferred to the secondary coil.

Figure 2F:
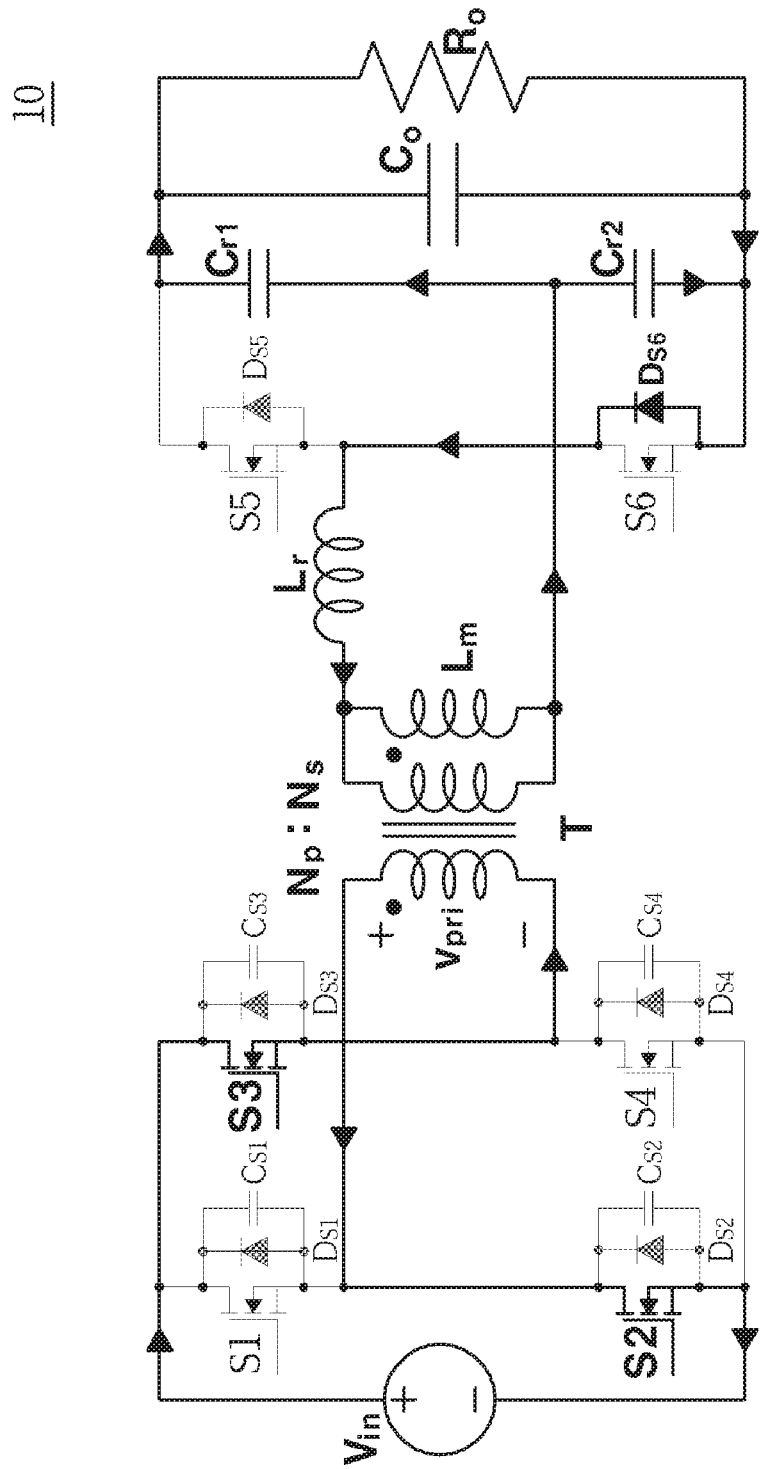

In the sixth resonant boost mode M6 as illustrated in FIG. 2F, the switches S2 and S3 of the full-bridge converter unit 11 and the body diode $D_{S6}$ of the switch S6 of the active doubler rectifier circuit 12 are retained in an on state, and the switches S1 and S4 of the full-bridge converter unit 11 and the switch S5 of the active doubler rectifier circuit 12 are turned off. Therefore, the electrical energy $i_{Lr}$ stored in the resonance inductor Lr is transferred toward the load Ro through the body diode $D_{S6}$ of the switch S6. At this time, the magnetizing current $i_{Lm}$ of the magnetizing inductor Lm continuously increases in a linear manner.

Figure 2G:
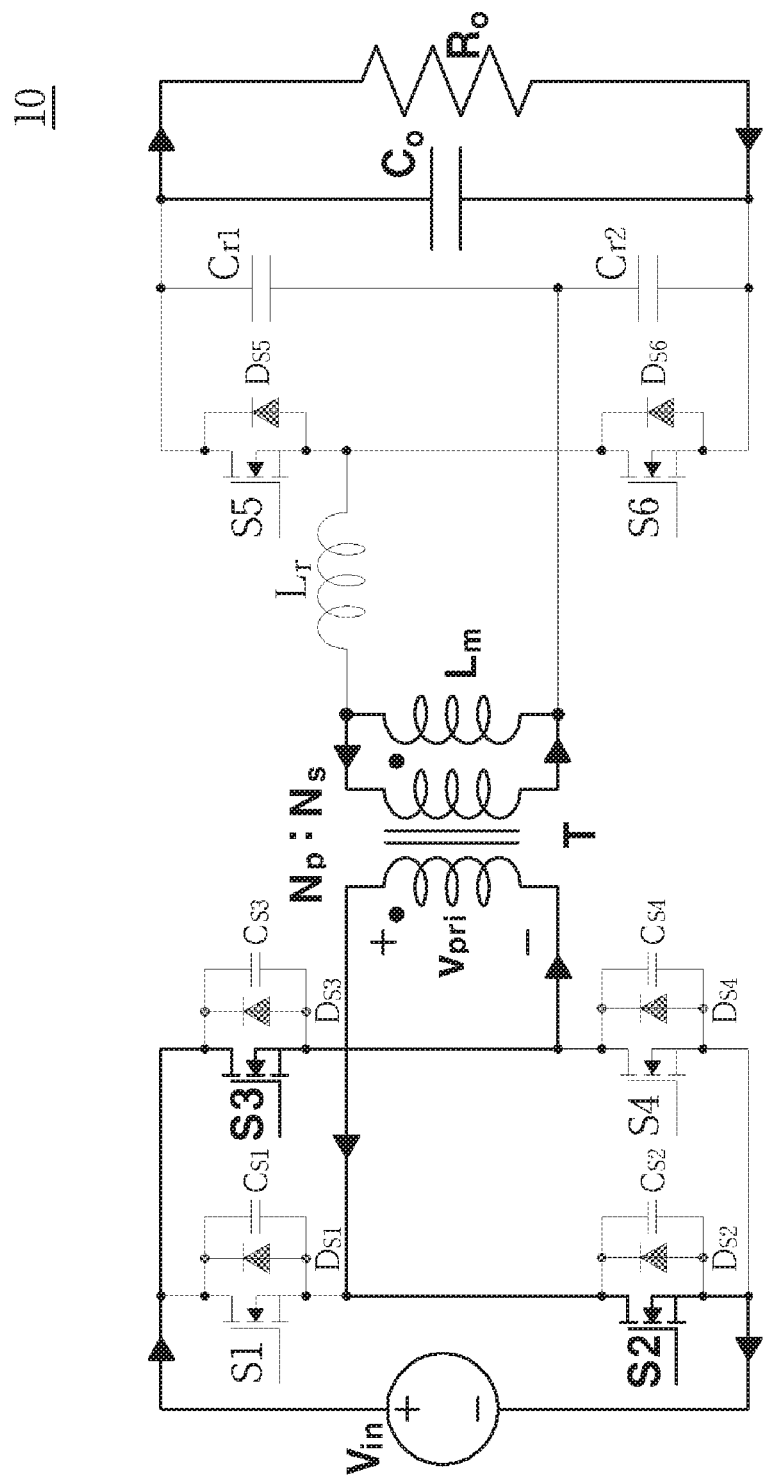

The seventh resonant boost mode M7 is started when the electrical energy $i_{Lr}$ stored in the resonance inductor Lr is zero ($i_{Lr}=0$). At this time, as illustrated in FIG. 2G, the switches S2 and S3 of the full-bridge converter unit 11 are turned on, and the switches S1 and S4 of the full-bridge converter unit 11 and the switches S5 and S6 of the active doubler rectifier circuit 12 are turned off. At this time, power is not transferred through the transformer T, and the magnetizing current $i_{Lm}$ of the magnetizing inductor Lm linearly increases in the negative direction as illustrated in FIG. 3.

Figure 2H:
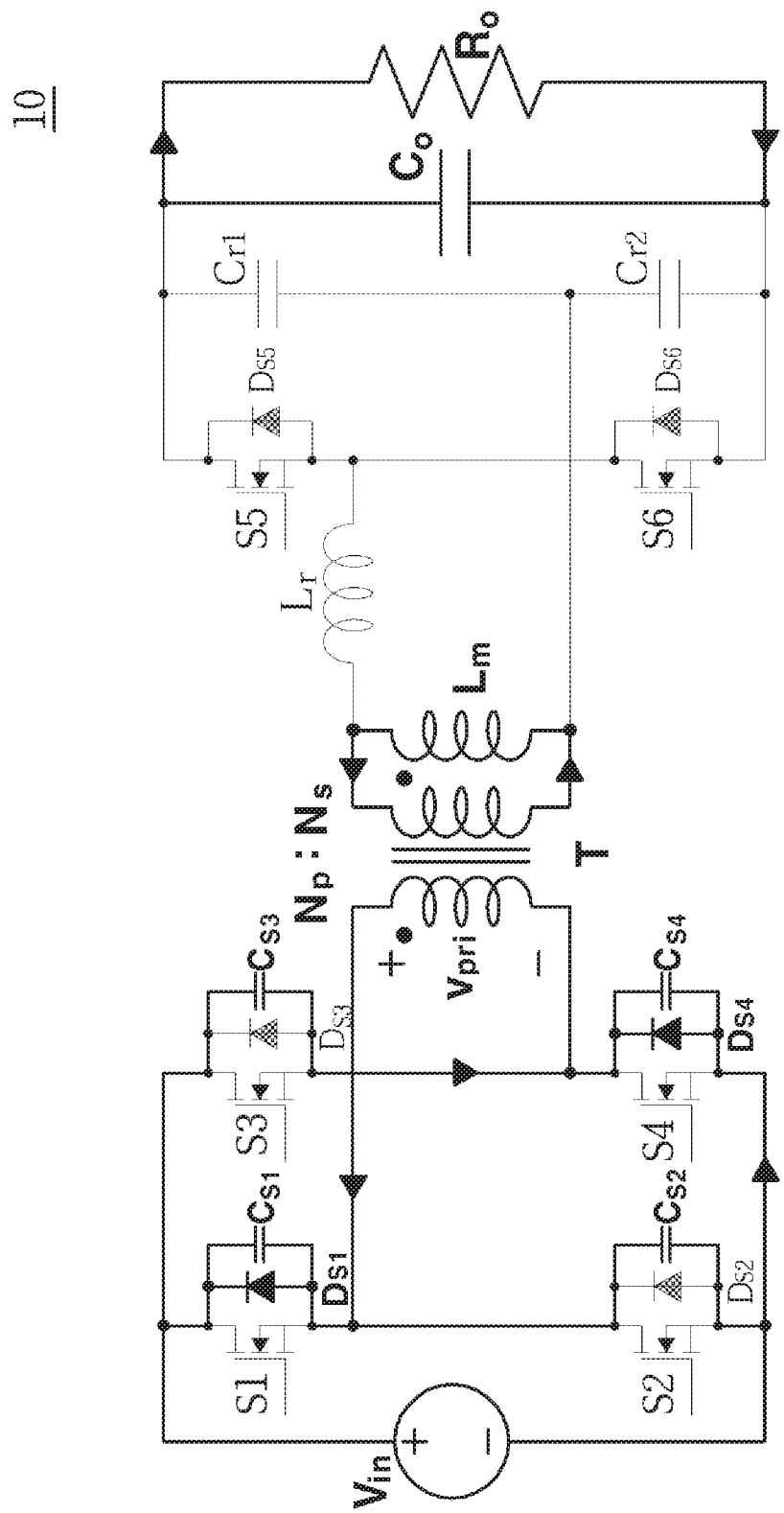

In the eighth resonant boost mode M8 as illustrated in FIG. 2H, the switches S1 to S4 of the full-bridge converter unit 11 and the switches S5 and S6 of the active doubler rectifier circuit 12 are all retained in an off state. At this time, the magnetizing current $i_{Lm}$ of the magnetizing inductor Lm operates as a current source which charges the parasitic capacitors $C_{s2}$ and $C_{s3}$ of the switches S2 and S3 while discharging the parasitic capacitors $C_{S1}$ and $C_{S4}$ of the switches S1 and S4. Therefore, when the switches S1 and S4 are turned on, zero voltage switching can be performed.

When the switches S1 to S4 of the full-bridge converter unit 11 perform a switching operation, the switches S1 to S4 can be soft-switched by the magnetizing inductor Lm of the transformer T. Therefore, the power conversion circuit 10 for a thermoelectric energy generator can be operated at high efficiency.

Furthermore, since the active voltage-doubler rectifier circuit 12 has a high boosting ratio, the turn ratio of the transformer T can be reduced. Therefore, the size, weight and energy consumption of the transformer T can be reduced.

According to the embodiment of the present invention, when an input voltage of the full-bridge converter unit is low, the boosting ratio of the full-bridge converter unit may be raised by a switching operation of the active voltage-doubler rectifier circuit, which makes it possible to cover a wider input voltage range than a typical full-bridge converter.

Furthermore, when the switches of the full-bridge converter are turned on, the switches perform zero-voltage switching, and when the switches are turned off, the switches perform zero-current switching. Moreover, when the switches of the active voltage-doubler rectifier circuit are operated in the resonant boost mode, the switches do not cause a reverse recovery problem. Thus, the power conversion circuit for photovoltaic power generation can be operated at high efficiency.

While various embodiments have been described above, it will be understood to those skilled in the art that the embodiments described are by way of example only. Accordingly, the disclosure described herein should not be limited based on the described embodiments.

What is claimed is:

1. A power conversion circuit for photovoltaic power generation with high efficiency over a wide input voltage range, comprising:
    a full-bridge converter unit comprising a full-bridge converter constituted by first to fourth switches, and configured to operate in a resonant boost mode or a phase-shift full-bridge series-resonant converter mode based on an input voltage, and convert an input DC voltage into a DC voltage having a level equal to or lower than the input DC voltage;
    an active voltage-doubler rectifier circuit comprising a half-bridge converter constituted by fifth and sixth switches, a resonance inductor and a resonance capacitor, and configured to boost a second input voltage to a target-level DC voltage, and output the target-level DC voltage to a load; and
    a transformer configured to connect the full-bridge converter and the active voltage-doubler rectifier to each other in their insulation,
    wherein the resonant boost mode includes a resonant boost state, and
    wherein when the full-bridge converter unit operates in the resonant boost state, either
        (a) the first and fourth switches are turned on, and the second and third switches and the fifth and sixth switches are turned off,
        or
        (b) the second and third switches are turned on, and the first and fourth switches and the fifth and sixth switches are turned off,
        so that no power is transferred through the transformer.

2. The power conversion circuit of claim 1, wherein the full-bridge converter unit is configured to operate in the resonant boost mode when the input voltage lower than a reference voltage is received, or operate in the phase-shift full-bridge series-resonant converter mode when the input voltage higher than the reference voltage is received, wherein the reference voltage indicates the input voltage when the first and fourth switches and the second and third switches are complementarily switched with a maximum turn-on phase difference, such that a maximum voltage is outputted to a secondary coil of the transformer.

3. The power conversion circuit of claim 1, wherein the fifth and sixth switches are maintained in an off state when the full-bridge converter unit operates in the phase-shift full-bridge series-resonant converter mode.

4. The power conversion circuit of claim 1, wherein the fifth and sixth switches are complementarily switched with a maximum turn-on phase difference when the full-bridge converter unit operates in the resonant boost mode.

5. The power conversion circuit of claim 1, wherein the resonant boost mode is divided into first to eighth resonant boost modes.

6. The power conversion circuit of claim 5, wherein when the full-bridge converter unit operates in the first resonant boost mode,
    the first and fourth switches and the sixth switch are turned on, and the second and third switches and the fifth switch are turned off, so that electrical energy stored in the resonance inductor rapidly increases, and power of a primary coil of the transformer is transferred to a secondary coil.

7. The power conversion circuit of claim 5, wherein when the full-bridge converter unit operates in the second resonant boost mode,
    the first and fourth switches and a body diode of the fifth switch are maintained in an on state, and the second and third switches and the sixth switch are turned off, so that electrical energy stored in the resonance inductor is transferred toward the load through the body diode of the fifth switch.

8. The power conversion circuit of claim 5, wherein when the full-bridge converter unit operates in the third resonant boost mode, which corresponds to the resonant boost state, the first and fourth switches are turned on, and the second and third switches and the fifth and sixth switches are turned off, so that no power is transferred through the transformer.

9. The power conversion circuit of claim 5, wherein when the full-bridge converter unit operates in the fourth resonant boost mode, the first to sixth switches are all maintained in an off state, and a magnetizing current of a magnetizing inductor of the transformer operates as a current source, such that parasitic capacitors of the first and fourth switches are charged while parasitic capacitors of the second and third switches are discharged.

10. The power conversion circuit of claim 5, wherein when the full-bridge converter unit operates in the fifth resonant boost mode, the second and third switches and the fifth switch are turned on, and the first and fourth switches and the sixth switch are turned off, so that electrical energy stored in the resonance inductor rapidly increases, and power of a primary coil of the transformer is transferred to a secondary coil.

11. The power conversion circuit of claim 5, wherein when the full-bridge converter unit operates in the sixth resonant boost mode, the second and third switches and a body diode of the sixth switch are retained in a turn-on state, and the first and fourth switches and the fifth switch are turned off, so that electrical energy stored in the resonance inductor is transferred to the load through the body diode of the sixth switch.

12. The power conversion circuit of claim 5, wherein when the full-bridge converter unit operates in the seventh resonant boost mode, which corresponds to the resonant boost state, the second and third switches are turned on, and the first and fourth switches and the fifth and sixth switches are turned off, so that no power is transferred through the transformer.

13. The power conversion circuit of claim 5, wherein when the full-bridge converter unit operates in the eighth resonant boost mode, the first to sixth switches are all retained in an off state, and a magnetizing current of a magnetizing inductor of the transformer operates as a current source which charges parasitic capacitors of the second and third switches while discharging parasitic capacitors of the first and fourth switches.

14. The power conversion circuit of claim 5, wherein a magnetizing current of a magnetizing inductor of the transformer linearly increases when the full-bridge converter unit operates in the first to fourth resonant boost modes, and linearly decreases when the full-bridge converter unit operates in the fifth to eighth resonant boost modes.

15. The power conversion circuit of claim 1, wherein the full-bridge converter unit is configured to operate in the resonant boost mode or the phase-shift full-bridge series-resonant converter mode based on the input voltage in relation to a reference voltage.

16. The power conversion circuit of claim 1, wherein the full-bridge converter unit is configured to operate in the resonant boost mode when the input voltage lower than a reference voltage is received, or operate in the phase-shift full-bridge series-resonant converter mode when the input voltage higher than the reference voltage is received.

17. The power conversion circuit of claim 1, wherein the input voltage is the input DC voltage, and the second input voltage is a voltage inputted from the transformer.

* * * * *